US009418617B1

(12) United States Patent
Starner et al.

(10) Patent No.: US 9,418,617 B1
(45) Date of Patent: Aug. 16, 2016

(54) METHODS AND SYSTEMS FOR RECEIVING INPUT CONTROLS

(71) Applicants: Thad Eugene Starner, Mountain View, CA (US); Michael Patrick Johnson, Sunnyvale, CA (US); Bo Wu, Alhambra, CA (US)

(72) Inventors: Thad Eugene Starner, Mountain View, CA (US); Michael Patrick Johnson, Sunnyvale, CA (US); Bo Wu, Alhambra, CA (US)

(73) Assignee: Google Inc., Mountain View, CA (US)

( * ) Notice: Subject to any disclaimer, the term of this patent is extended or adjusted under 35 U.S.C. 154(b) by 103 days.

(21) Appl. No.: 13/801,772

(22) Filed: Mar. 13, 2013

(51) Int. Cl.
G02B 27/01 (2006.01)
G09G 5/00 (2006.01)
G06F 3/01 (2006.01)
G02B 27/00 (2006.01)

(52) U.S. Cl.
CPC ............ *G09G 5/003* (2013.01); *G02B 27/0093* (2013.01); *G02B 27/017* (2013.01); *G06F 3/013* (2013.01)

(58) Field of Classification Search
CPC ................. G06F 3/013; G02B 27/017; G02B 2027/0178; G02B 27/0093
USPC .................................. 345/156, 158; 715/863
See application file for complete search history.

(56) References Cited

U.S. PATENT DOCUMENTS

| | | | |
|---|---|---|---|
| 5,649,061 A * | 7/1997 | Smyth | A61B 3/113 250/221 |
| 7,515,054 B2 | 4/2009 | Torch | |
| RE42,471 E | 6/2011 | Torch | |
| 8,031,970 B2 * | 10/2011 | Li | G06K 9/00597 382/173 |
| 8,073,198 B2 * | 12/2011 | Marti | G06F 3/011 345/156 |
| 8,096,946 B2 | 1/2012 | Burton | |
| 8,405,610 B1 * | 3/2013 | Cole | G06F 3/013 345/158 |
| 8,457,367 B1 * | 6/2013 | Sipe | G06K 9/00221 382/118 |
| 2002/0122014 A1 * | 9/2002 | Rajasingham | G02B 27/017 345/8 |
| 2010/0253907 A1 * | 10/2010 | Korb | A61B 3/0025 351/206 |
| 2011/0071416 A1 * | 3/2011 | Terada | A61B 5/0478 600/544 |
| 2011/0149239 A1 * | 6/2011 | Neal | A61B 3/0025 351/205 |
| 2012/0146891 A1 * | 6/2012 | Kalinli | H04N 19/33 345/156 |
| 2012/0229248 A1 | 9/2012 | Parshionikar et al. | |
| 2012/0242570 A1 * | 9/2012 | Kobayashi | G06F 3/017 345/156 |
| 2013/0257709 A1 * | 10/2013 | Raffle | G06F 3/017 345/156 |

* cited by examiner

*Primary Examiner* — Thomas Alunkal
(74) *Attorney, Agent, or Firm* — McDonnell Boehnen Hulbert & Berghoff LLP

(57) ABSTRACT

Examples methods and systems for distinguishing winks from other eye motions are described. In some examples, a method for distinguishing winks from other eye motions may account for changes in orientation of a computing device relative to a user, calibrate eye gesture recognition, or increase efficiency of the computing device. A computing device may be configured to receive sensor data corresponding to an eye and determine a distribution of magnitude changes in the sensor data over an interval of time. The computing device may identify clusters that correspond to ranges of magnitude changes within the distribution and use the clusters as reference data to identify ranges of sensor data for different types of eye motions, including differentiating winks from clusters indicative of ranges of normal eye activity and blinks.

20 Claims, 12 Drawing Sheets

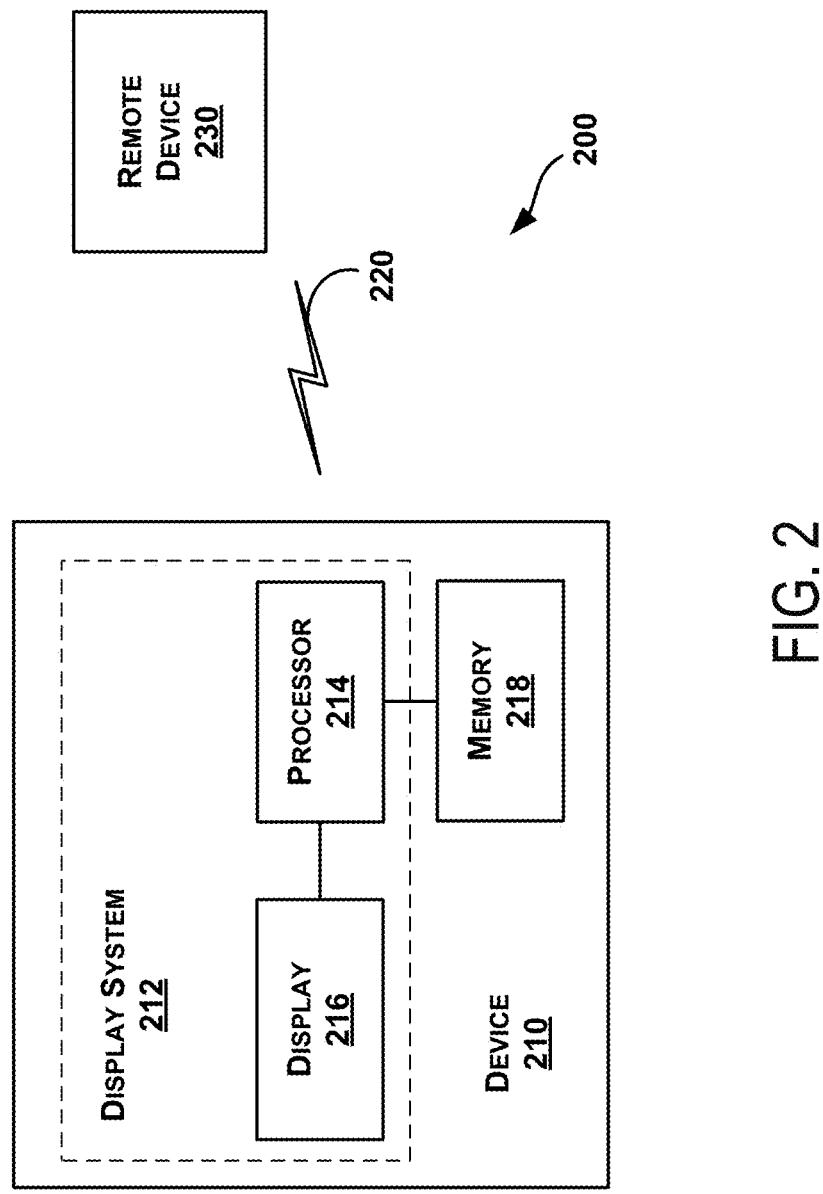

METHODS AND SYSTEMS FOR RECEIVING INPUT CONTROLS

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

A device, such as a head-mountable device (HMD), may be configured to receive sensor data from proximity sensors directed towards an eye or eyes of a person, and to detect reference data (e.g., data patterns) that correspond to certain eye movements, such as winks and blinks. The reference data that corresponds to a particular eye gesture, such as a blink or a wink, may vary from person to person. Accordingly, calibration may be useful to create and/or adjust reference data to match the eye movement of a particular wearer. Further, for a given wearer, the reference data that corresponds to a particular eye gesture may vary over time, depending on variables such as the HMD position relative to the eye and the lighting in the wearer's environment. Therefore, periodic re-calibration may also be useful in order to adjust for such changes. Unfortunately, typical calibration processes that require the wearer to stop what they are doing and perform certain eye gestures, for example, may be considered burdensome and undesirable.

Accordingly, example embodiments may help to provide for calibration of eye-gesture reference data in a manner that does not require the wearer to do anything other than use their HMD as they normally would.

In particular, the HMD may observe proximity sensor data over an interval of time and generate a distribution (e.g., a cumulative density function (CDF)), over a range of magnitude changes, which indicates the number of times during the interval that each magnitude change was observed in the proximity-sensor data. The HMD may detect two ranges of proximity-sensor data in where observed magnitude changes are clustered (e.g., ranges in which magnitude changes are observed most often). Further, the HMD may map the higher of the two ranges to blinks, based on the observation that the magnitude changes resulting from normal eye activity are typically smaller than the magnitude changes that result from blinks. The device may then use the distribution as reference data against which to compare incoming proximity-sensor data to detect blinks (and possibly to detect normal eye movements as well). Specifically, the HMD may detect a blink by detecting a magnitude change in proximity sensor data that is within the range of the higher cluster in the distribution. Other types of sensors may be used to detect eye motions in other implementations.

Further, based on the observation that winks typically result in greater magnitude changes in the proximity-sensor data, than result from both blinks and normal eye movements, the HMD may define a threshold magnitude change for detecting winks, which is greater than the upper end of the range mapped to blinks. The HMD may thus detect a wink by detecting a magnitude change in the proximity-sensor data that is greater than the threshold.

In one aspect, a system associated with a device, such as a HMD, may include a computing system configured to receive sensor data corresponding to at least one eye. The computing system may include a computer-readable medium and program instructions stored on the computer-readable medium and executable by at least one processor. The system may be configured to determine a distribution of magnitude changes in the sensor data over a predetermined interval of time. The system may further identify, within the distribution, a first magnitude-change cluster and a second magnitude-change cluster, wherein the first magnitude-change cluster and the second magnitude-change cluster correspond to a first range and a second range of magnitude changes, respectively. In addition, the system may generate reference data that maps the second magnitude-change cluster to blinks based on the relationship between the first magnitude-change cluster and the second magnitude-change cluster.

In another aspect, an example method may involve receiving sensor data corresponding to at least one eye and determining a distribution of magnitude changes in the sensor data over a predetermined interval of time. The method may further include identifying, within the distribution, a first magnitude-change cluster and a second magnitude-change cluster, wherein the first magnitude-change cluster and the second magnitude-change cluster correspond to a first range and a second range of magnitude changes, respectively. The method may also include generating reference data that maps the second magnitude-change cluster to blinks based on the relationship between the first magnitude-change cluster and the second magnitude-change cluster.

In a further aspect, a non-transitory computer readable medium may have stored therein instructions that are executable to cause a computing system to perform functions including: (a) receiving sensor data corresponding to at least one eye; (b) determining a distribution of magnitude changes in the sensor data over a predetermined interval of time; (c) identifying, within the distribution, a first magnitude-change cluster and a second magnitude-change cluster, wherein the first magnitude-change cluster and the second magnitude-change cluster correspond to a first range and a second range of magnitude changes, respectively; and (d) generating reference data that maps the second magnitude-change cluster to blinks based on the relationship between the first magnitude-change cluster and the second magnitude-change cluster.

In another embodiment, an example system may involve a means for receiving sensor data corresponding to at least one eye and determining a distribution of magnitude changes in the sensor data over a predetermined interval of time. The system may further include a means for identifying, within the distribution, a first magnitude-change cluster and a second magnitude-change cluster, wherein the first magnitude-change cluster and the second magnitude-change cluster correspond to a first range and a second range of magnitude changes, respectively. The system may also include a means for generating reference data that maps the second magnitude-change cluster to blinks based on the relationship between the first magnitude-change cluster and the second magnitude-change cluster.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 2 is a simplified block diagram of a computing device according to an example embodiment.

DETAILED DESCRIPTION

Figure 1A:
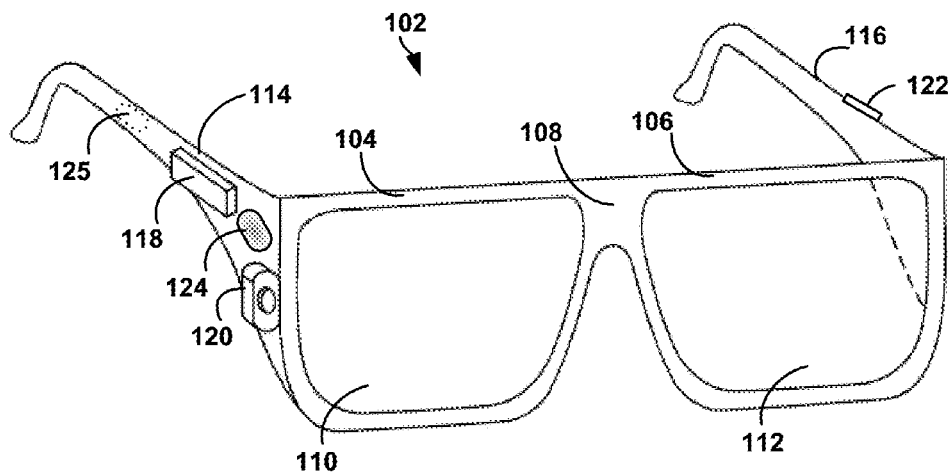
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

A. Overview

Embodiments described herein may relate to and/or may be implemented in or as part of a computing system or device, such as a head-mountable device (HMD), in order to calibrate a process that detects blinks, winks, and/or other eye gestures, and/or to provide other benefits. More specially, an example embodiment may utilize a distribution of magnitude changes that are observed in proximity-sensor data to detect blinks, winks, and/or other types of eye movements or gestures.

It has been observed that within a magnitude-change distribution, the magnitude changes in proximity-sensor data that correspond to blinks and the magnitude changes that correspond to normal eye movement (e.g., looking around) are typically clustered in two ranges, with the range of magnitude-changes for blinks being greater than the range of magnitude-changes for normal eye movement. While the specific ranges of magnitude changes that correspond to each type of eye movement may vary from person to person and/or due to changes in the environment or manner in which the HMD is worn, the general relationship of the ranges, with the range resulting from blinks being greater than the range resulting from normal eye movement, generally holds true.

Accordingly, when proximity-sensor data is observed over an interval of time, there will be two clusters, with the first cluster resulting from normal eye movement occurring in a lower range of magnitude changes, and second cluster resulting from blinks in a higher range of magnitude changes. The HMD may therefore calibrate its reference data by mapping the lower observed range of magnitude changes to normal eye movement and the higher observed range of magnitude changes to blinks.

Further, while the exact range of magnitude changes that corresponds to winks may vary, it has been observed that winks typically cause a greater magnitude change in proximity-sensor data than both blinks and normal eye movement. Accordingly, once the HMD has mapped a range of magnitude changes to blinks, the HMD may determine a threshold magnitude change for winks that is greater than the upper end of the range for blinks. The HMD may therefore detect a wink whenever it detects a magnitude change in the proximity-sensor data that is greater than the threshold.

In an example embodiment, an HMD may be configured to determine one or more confidence intervals to assist in developing the reference data. A confidence interval may be used to define acceptable parameter ranges for expected eye motions. For example, the HMD may be configured to use a 95% confidence interval for blinks that defines the upper and lower bound of the magnitude-change range for blinks. The HMD may determine any magnitude change eye motions detected by the proximity sensors that exceed the upper bound of the magnitude-change range for blinks or a threshold above the upper bound may be a wink. In some implementations, the HMD may apply multiple confidence intervals at different percentages to assist in determining winks. Moreover, the HMD may determine that the variance in magnitude may have resulted from detecting the sensor data of a wink instead of a blink. The HMD may calibrate its system, execute tasks, and update/adjust the distribution in response. Further, the HMD may use other methods of density estimation as well, such as Gaussian functions or a mixture of Gaussians functions, to compare newly received sensor data.

In a further aspect, a computing device such as an HMD may perform actions in response to determining the detection of certain types of eye motions (e.g., winks); such as take a picture, connect to the Internet, and make a telephone call, etc. The computing system may generate and analyze distributions in real-time.

It should be understood that the above embodiments, and other embodiments described herein, are provided for explanatory purposes, and are not intended to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

B. Example Wearable Computing Devices

Systems and devices in which examples may be implemented will now be described in greater detail. In general, an example system may be implemented in or may take the form of a wearable computer (also referred to as a wearable computing device). In an example, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or a mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that the device may be worn on the head. Further, examples may be implemented by or in association with an HMD with a single display or with two displays, which may be referred to as a "monocular" HMD or a "binocular" HMD, respectively.

FIG. 1A illustrates a wearable computing system according to one example. In FIG. 1A, the wearable computing system may take the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens frames 104, 106 and a center frame support 108, lens elements 110, 112, and extending side-arms 114,116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that may suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
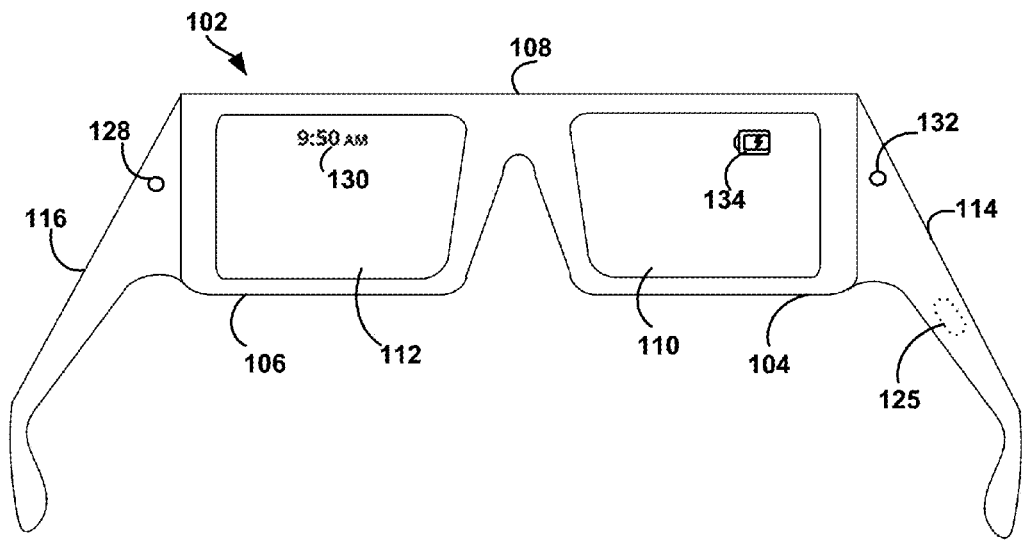
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
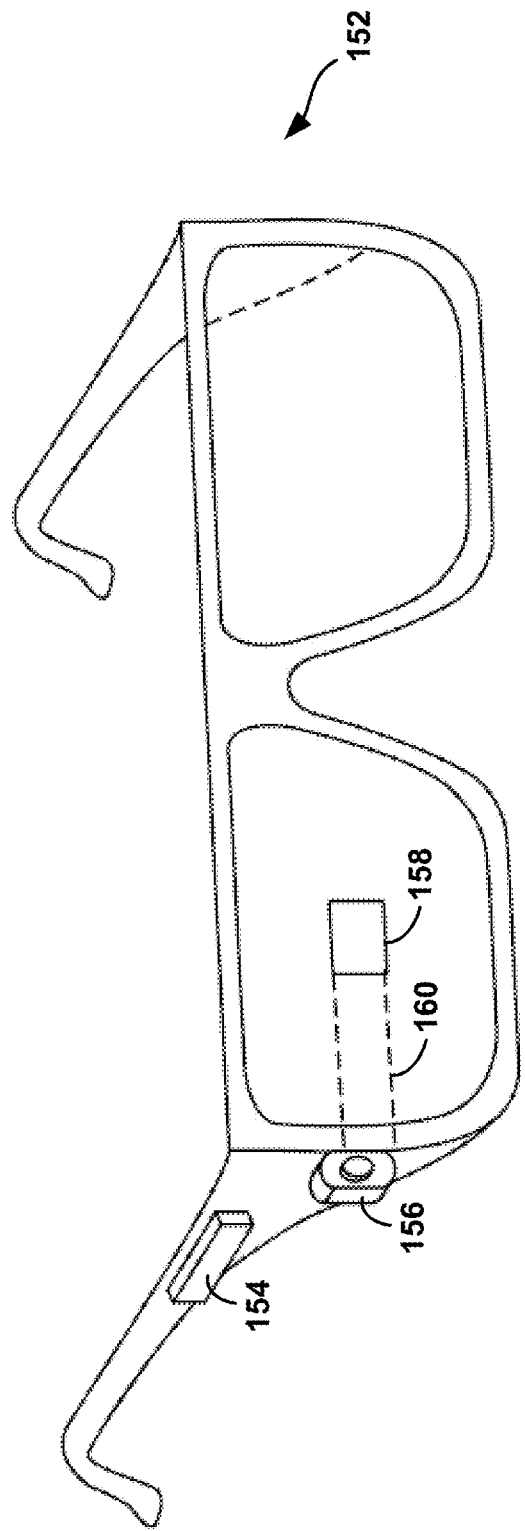
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
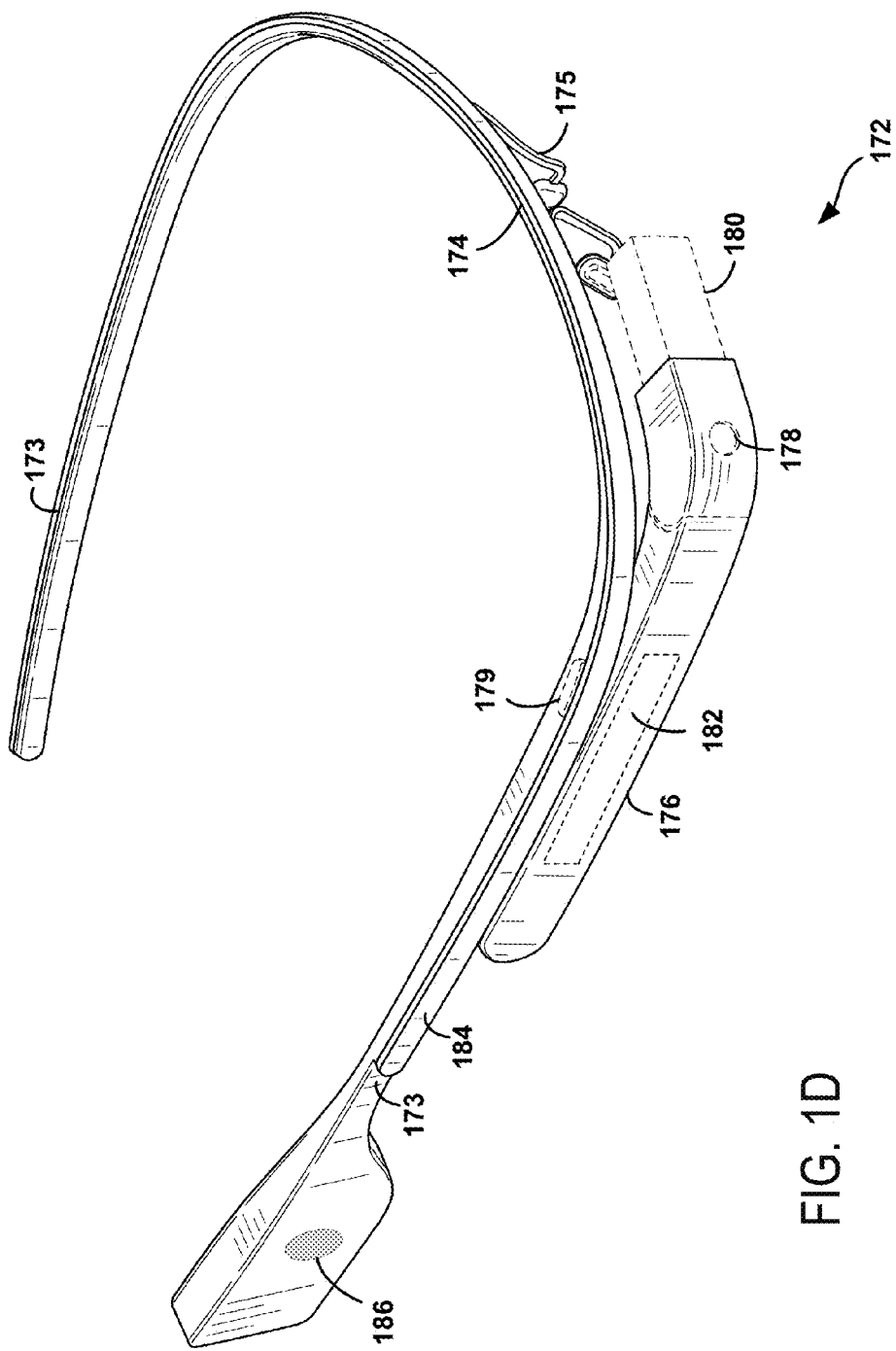
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
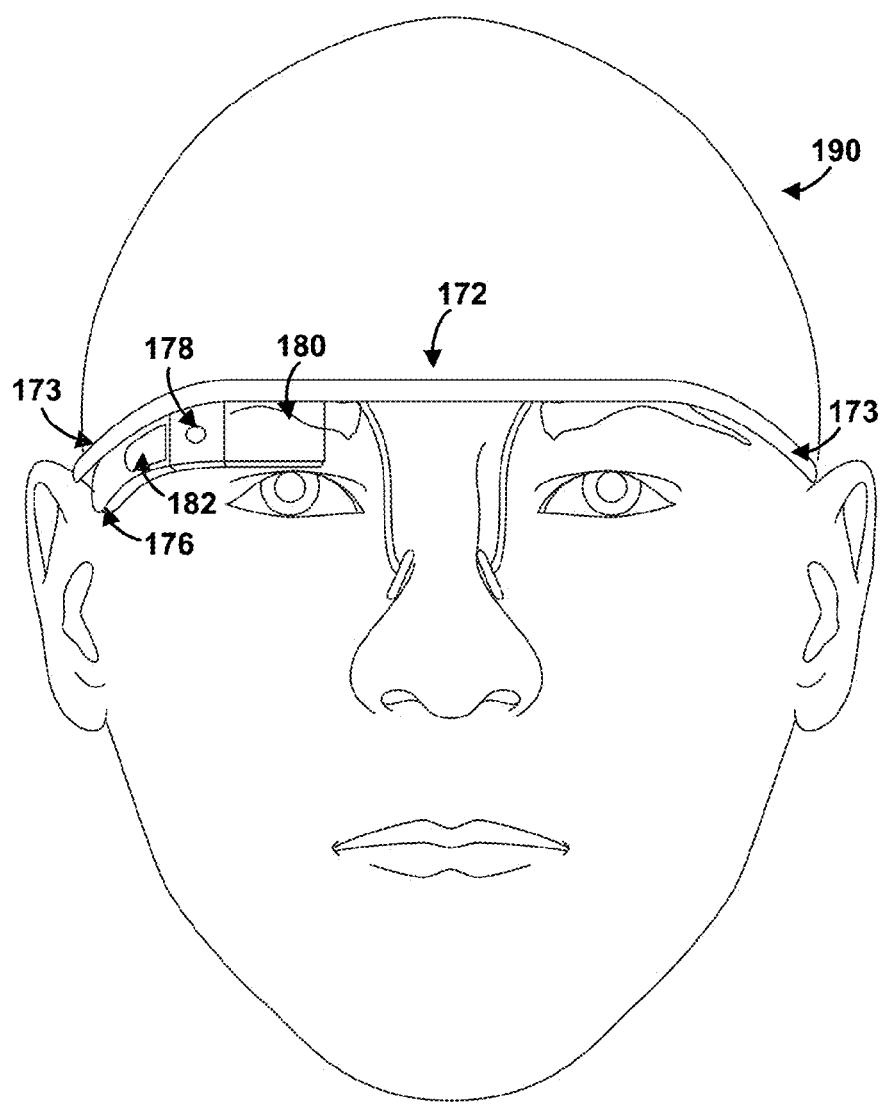
FIGS. 1E to 1G are simplified illustrations of the wearable computing system shown in FIG. 1D, being worn by a wearer.
Figure 1F:
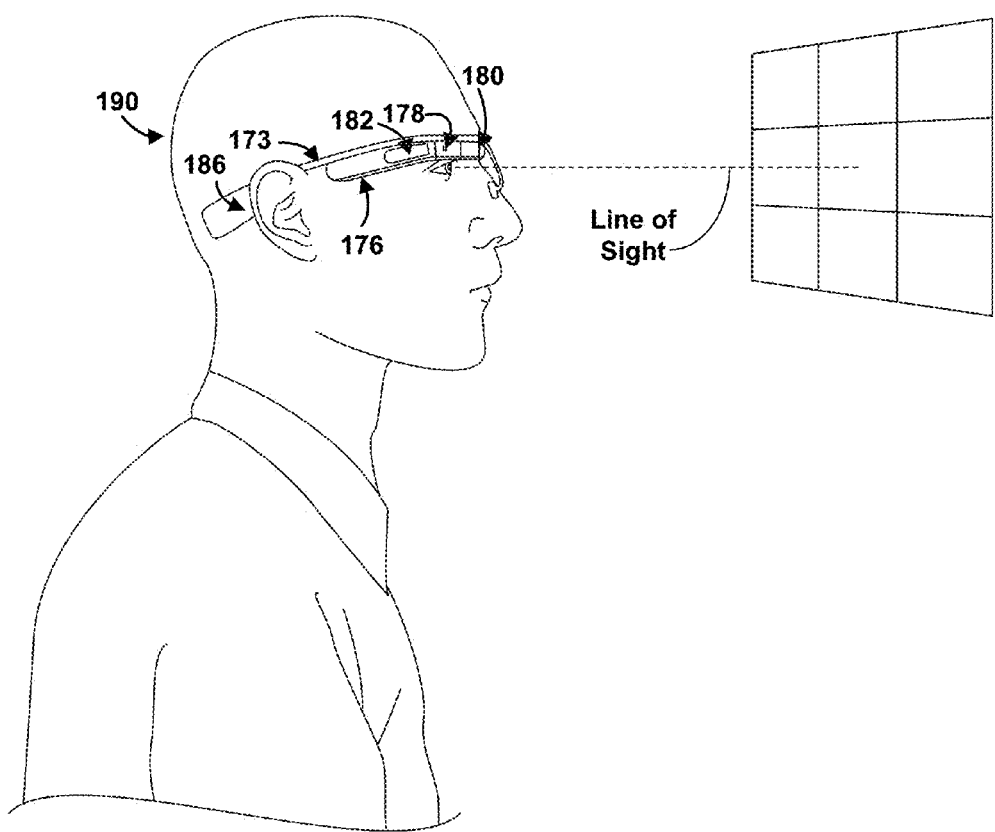
Figure 1G:
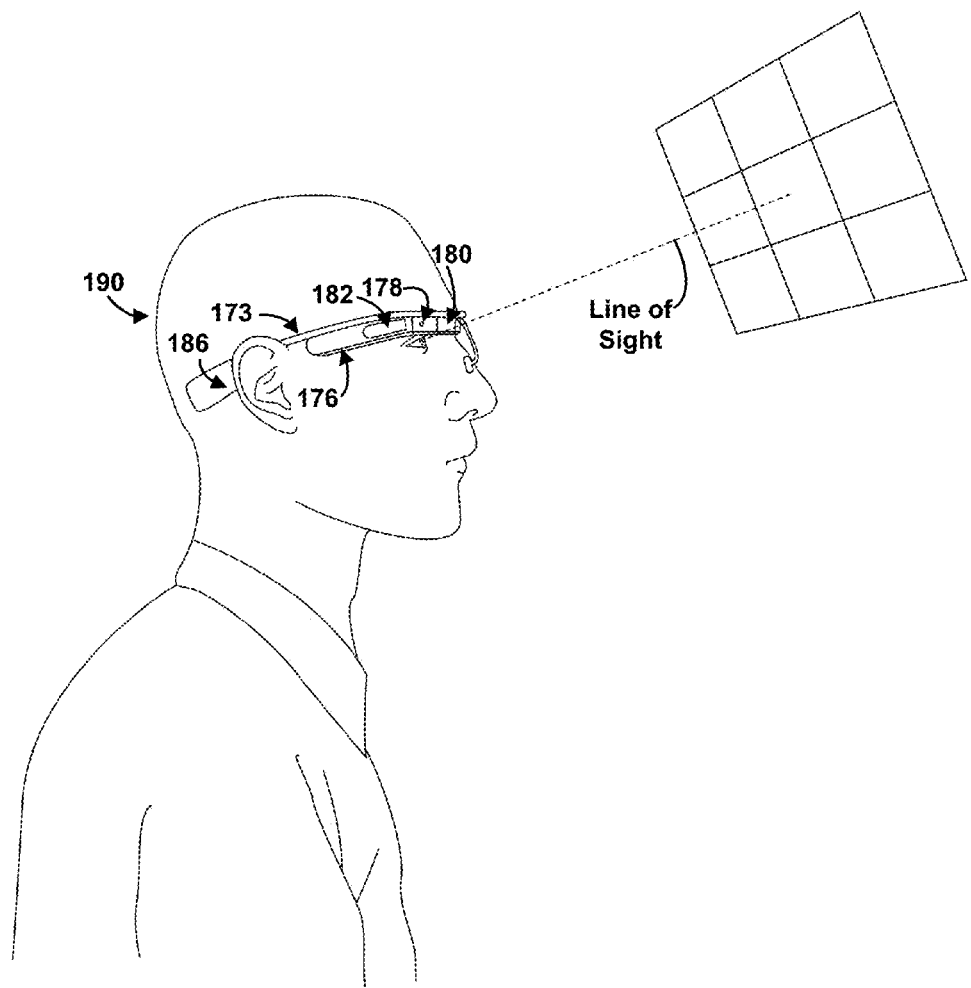

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

FIG. 2 is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 that includes a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Figure 3:
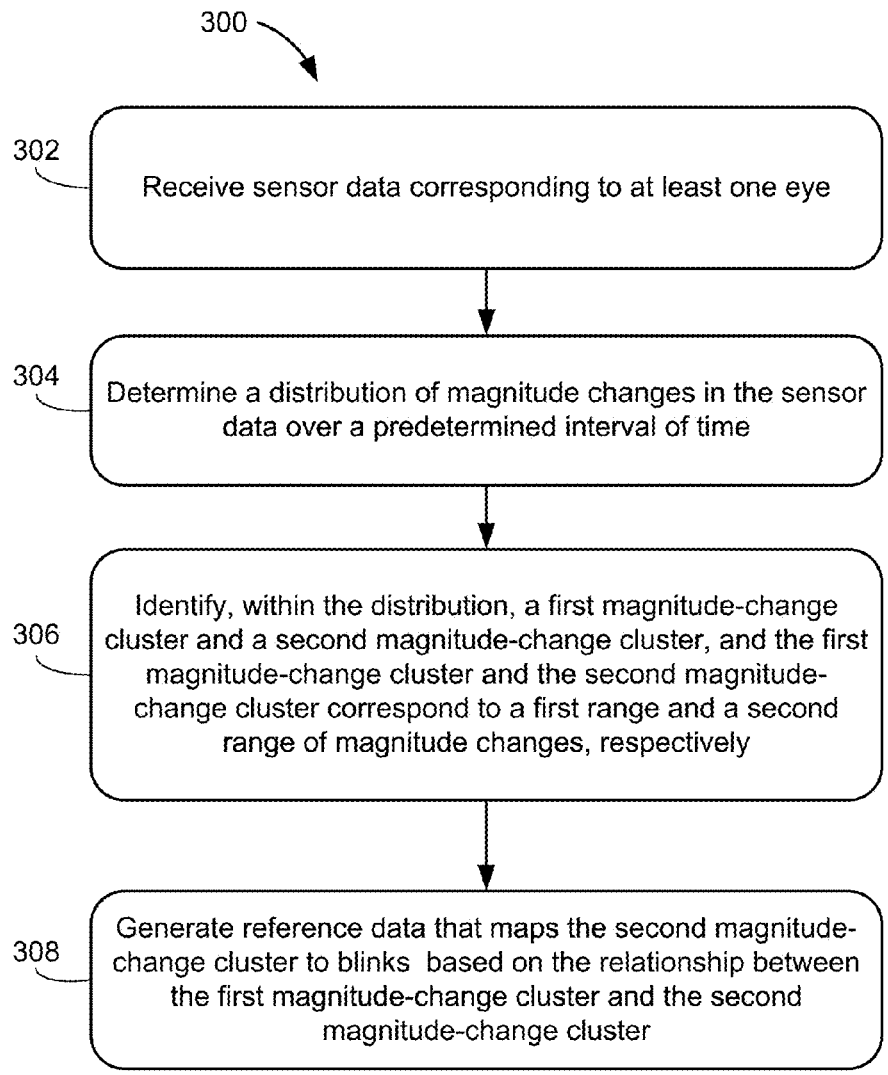
FIG. 3 is a flow chart illustrating an example method for distinguishing winks from other eye motions.

FIG. 3 is a flow chart illustrating an example method for distinguishing winks from other eye motions. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/ or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

Method 300 illustrated in FIG. 3 presents an example of a method that may be performed by a device, such as any devices illustrated in FIGS. 1A-1D, or components of the devices. For example, an HMD may be configured to perform method 300 to adjust a system within the device for eye gesture recognition to improve execution, efficiency, make minor adjustments, or to fix errors within the system. In another example, an HMD may be configured to perform method 300 to update and calibrate the eye gesture recognition or the overall system of the HMD.

In addition, an HMD may be configured to perform method 300 in response to changes in the orientation of the HMD relative to the wearer, such as when the HMD slides down the nose of a wearer, and make appropriate adjustments in response, for example. The HMD may perform method 300 in real-time, a predefined schedule, and/or in intervals. Furthermore, an HMD may determine if the HMD is being worn prior to calibrating the device and may associate the HMD with a particular user-account, since the HMD may be configured to operate differently based on if the HMD is currently on the wearer.

For the sake of example, the method shown in FIG. 3 will be described as implemented by an HMD. It should be understood that other entities can implement one or more steps of the example method.

At block 302, the method 300 involves receiving sensor data corresponding to at least one eye. A computing system may receive sensor data via proximity sensors or other means from the eye(s) of a user. In some examples, the HMD may receive sensor data through the use of image captures, measuring devices, or other types of data extraction methods.

An HMD, such as the ones discussed in FIGS. 1A-2, may use one or more proximity sensors to detect changes in magnitude over a predefined interval of time corresponding to the one or both eyes of a user. The HMD may use the proximity sensors to detect sensor data relating to normal eye activity, blinks, winks, and other types of eye movement. Further, the HMD may position the proximity sensors in various ways, such as focusing the proximity sensors upon the edge of an eye or directly at the center of the eye. The HMD may use various types of lighting to help receive sensor data as well.

During detection of eye motions, a computing system may capture sensor data containing information related to different parameters associated with the eye motions, which may include measurements relating to amplitudes of eye motions, changes in magnitude, and overall duration of motions. The computing system may detect different parameters based on the types of eye motions and may even receive slightly varying sensor data values from different detections of the same type of eye gesture by the computing system. For example, an HMD may detect multiple blinks, where each blink has a slightly different value for magnitude change. Based on the slight differences, the HMD may determine a range for acceptable changes in magnitude that correspond to blink. In addition, the HMD may be configured to tolerate and accept slight differences in sensor data at different degrees depending on the type of eye motion.

At block 304, the method 300 involves determining a distribution of magnitude changes in the sensor data over a predetermined interval of time. After a computing system receives sensor data corresponding to one or more eyes, the computing system may generate a distribution using the magnitude changes or other parameters related to the sensor data over a predetermined interval of time. The computing system may use the continuously received sensor data corresponding to the eye or eyes of a user to generate a distribution of the received sensor data, which may be updated in real-time. The distribution may show the variance in magnitude change values detected by the computing device. As discussed above, an HMD may determine different values of magnitude changes for normal activity, blinks, and winks from the received sensor data. Using the differences, the HMD may build a distribution that shows the different ranges of acceptable sensor data that corresponds to certain types of eye motions. Further, the distribution may show the values of magnitude changes that occur more frequently than other values of magnitude changes.

A device may use a predetermined interval of time in the form of seconds, minutes, or even longer. For example, an HMD may be configured to calibrate its system every three minutes by erasing the current distribution and starting the generation of a new distribution from the newly received sensor data from detecting the eye or eyes of a user. Furthermore, a device may be configured to receive input from the user requesting reset of the system data resulting in a new generation of a distribution. A device may also include a buffer and/or rolling that may be used to generate a new distribution to replace the current distribution to constantly calibrate the device.

Additionally, a device may store the distribution in various types of formats, such as histograms, Gaussian distributions, or other means. For example, a device may use a histogram to display the various ranges of changes of magnitude corresponding to certain types of eye activity. The device may store the distribution in memory or may store and access the distribution in another entity (e.g., a server). The device may associate a distribution with a particular user-account and may be able to switch between different distributions if different users use the device. Further, the device may store a distribution and make adjustments to that distribution at a later period of time. During compilation of the distribution, a device may use a blank slate and rely completely on received sensor data to generate the distribution. In other examples, a device may use a template distribution that the device may easily adjust to fit the received sensor data of the user.

At block 306, the method 300 further involves identifying, within the distribution, a first magnitude-change cluster and a second magnitude-change cluster, and the first magnitude-change cluster and the second magnitude-change cluster correspond to a first range and a second range of magnitude changes, respectively. A device may be configured to identify clusters within the generated distribution that represent ranges of magnitude changes that occur more frequently than other ranges of magnitude changes. Clusters may build up within the distribution from the accumulation of reoccurring values of sensor data within close ranges. For example, a device may detect and receive sensor data associated with involuntary blinks. Since a device is likely to detect a large number of a blinks, which may each have similar sensor data, a cluster may build up at the range of sensor data that is indicative of a blink. The clusters may have a wide range of acceptable values of sensor data, or may be more specific and require certain values of sensor data.

The device may use various means to identify the values of sensor data (e.g., magnitude changes) that occur more often than other values. Since a device is likely to detect and receive similar sensor data for types of eye motions, the distribution may accumulate clusters representative of the different types for the ranges of the eye motions and likely low to none occurrences for values that are not within an eye motion range. A device may perform calculations associated with the clusters, such as determining the minimum and maximum of each cluster, the average value of sensor data within the cluster, and/or the number of times values within the cluster has been received by the device, etc. The calculations may be used by the device to compare incoming sensor data to determine type of eye motion.

At block 308, the method 300 includes generating reference data that maps the second magnitude-change cluster to blinks based on the relationship between the first magnitude-change cluster and the second magnitude-change cluster. After the system identifies clusters within the distribution generated from received sensor data, the system may generate reference data that maps the second magnitude-change cluster to blinks based on the relationship between the first magnitude-change cluster and the second magnitude-change cluster. Similarly, the system may also generate reference data that maps the first magnitude-change cluster to normal eye activity. The first cluster on the distribution may have a lower range for magnitude changes, which may represent the received sensor data corresponding to detected normal eye activity. A device is likely to detect the least amount of magnitude changes from detecting normal eye movement.

Similarly, the system may determine that a second cluster within the distribution may correspond to a range of magnitude-changes related to the detection of blinks. The second cluster may have a range of magnitude-changes greater than the first cluster corresponding to normal activity. A device may detect greater changes in magnitude from blinks than normal eye activity or may detect the opposite in another example. In some examples, the clusters may overlap showing that the ranges may share some values for magnitude changes in common. Furthermore, in some examples, the cluster corresponding to lower changes in magnitude may correspond to blinks and the cluster related to the higher changes in magnitude may correspond to normal eye activity.

Moreover, a device may determine that magnitude changes that are greater than in both the first cluster and second cluster of the distribution may correspond to a wink. In some instances, the device may be configured to determine if the magnitude change values to extend above a threshold amount beyond the ranges of magnitude changes corresponding to normal eye activity and blinks in order for the device to recognize that particular value of magnitude change as a wink. By mapping out the clusters, the device may use the distribution to quickly compare and identify detected eye motions based on the received sensor data relative to the sensor data mapped on the distribution. In some examples, a device may be configured to associate clusters with additional types of eye motions, such as a double blink, etc.

In one example implementation of method 300, a device may be configured to use different levels of accuracy expectations for different types of eye motions. The device may be configured with higher threshold expectations for winks than for blinks and normal eye activity. The device may adjust cluster size or expect sensor data closer to the average of clusters in order to vary accuracy expectations for some types of eye motions, for example.

In another example implementation of method 300, the distribution that is generated by an HMD may take the form of a histogram indicating the number of occurrences of each magnitude change, over a range of magnitude ranges, which occur during a calibration interval. Clusters that correspond to normal eye movement, blinks, and possibly winks, may be represented in the histogram in the form of Gaussian distributions. In particular, a first Gaussian curve may result from normal eye movement that occurs during the calibration interval, and a second Gaussian curve may result from blinks that occur during the calibration interval. The histogram may further include a third Gaussian curve that results if winks occur during a calibration interval (or if the histogram is updated when winks are observed at a later time). The HMD may be configured to determine statistical information within the histogram, such as the means/averages within each Gaussian curve, in order to determine the magnitude changes in the sensor data that correspond to normal eye activity, blinks, or winks.

Similarly, the HMD may be configured to determine a mean and/or variance for each curve and may determine a threshold that corresponds to winks. For example, the HMD may determine a standard deviation from the mean value in the Gaussian curve that assists in determining winks. If the HMD receives sensor data related to a magnitude change greater than the standard deviation from the mean for a blink, that magnitude change may be indicative of a wink. For example, if a blink cluster has a mean of 100 and a standard deviation of 10, then anything above 110 could be considered a wink. In other instances, the HMD may be configured to require greater than two, three, or another amount of standard deviations to determine a wink from a blink. Additional calculation may be performed by the HMD using the information provided by generating the Gaussian distributions. Further, the HMD may update the Gaussian distributions in real-time and may reset periodically to ensure the proper calibration of the eye recognition system to the current environment and user. The HMD may be configured to use Maximum Likelihood estimation to fit a Gaussian curve over each of the developing clusters. The HMD may use Maximum Likelihood estimation to determine a threshold over which the magnitude change is considered a wink and under is considered a blink. Moreover, the HMD may determine the threshold by drawing both Gaussians curves indicative of the eye motions on the histogram to visualize the intersection between the two Gaussian curves.

After determining the threshold using Maximum Likelihood estimation, in order to determine winks, the HMD may be configured to change the threshold to reduce false negatives or false positives. Similarly, the HMD may vary the threshold based on multiplying the Gaussian curves by each curves' relative prior weight. Since blinks are more common than winks, the HMD may determine that the peak of the Gaussian curve indicative of blinks is significantly taller than the peak of the Gaussian curve indicative of winks. Correspondingly, the HMD may determine that the spread of the Gaussian curve indicative of blinks may be higher as well. As a result, the HMD may decrease the Gaussian curve indicative of winks by varying the threshold level.

In some implementations of method 300, when an HMD is being initially used and placed on the face of a user, the HMD may be configured to set a conservative magnitude-change threshold for winks (e.g., by setting the threshold to a higher magnitude change), in an effort to avoid false positives.

C. Example Calibration Implementations

An HMD may be configured to calibrate its system in response to different calibration events. For example, the HMD may calibrate in response to determining that the HMD has been put on the face of the user. Similarly, the HMD may calibrate after detecting movement of the HMD above a threshold. The HMD may calibrate the system if the HMD detects a movement of the proximity sensors of the HMD relative to the eye(s) of a user. Further, the HMD may detect that it was temporarily taken off and placed back on by the user and calibrate accordingly. Other example calibration events may include detecting changes in the lighting of the environment of the HMD, receiving input from a user, or in response to detecting system errors, etc.

Moreover, an HMD may refine its system and stored reference data continuously or during predefined intervals. The HMD may update a distribution corresponding to received sensor data from proximity sensors in real-time. In some instances, the HMD may be configured to generate a new distribution every three minutes. The HMD may be configured to use a distribution while generating a new distribution to use. Further, the HMD may use the old distribution until the new distribution contains at least a threshold amount of sensor data.

In some embodiments, an HMD may associate generated reference data to particular user-accounts and may be capable of storing reference data in memory within the HMD or another entity (e.g., server) for later use. For example, an HMD may be configured to identify a particular user through various means, such as receiving user input (e.g., specific password) or by comparing received sensor data from the user to previously stored reference data distributions to determine the user-account associated with the current user, etc. Based on the determination of the user, the HMD may access and use stored reference data associated with that particular user account. Thus, an HMD may be configured to quickly adapt to changes in user. In other implementations, an HMD may be configured to start a new distribution every time the HMD detects a change in user.

An HMD may be configured to scale a template to match a generated distribution in order to determine which clusters represent normal eye activity and blinks. Similarly, the HMD may be programmed to assume that a cluster with a range of lower magnitude change values is indicative of normal activity compared to a cluster with a range of higher magnitude change values that may be indicative of blinks. Further, an HMD may be configured with other predetermined guidelines to determine which clusters represent normal eye activity, blinks, and winks. Additionally, an HMD may, in some embodiments, require a cluster for blinks be within a certain range on the distribution, for various reasons. Although users may have differences in specific ranges for eye motions, an HMD may be configured to recognize that user distributions typically have the same or a similar generally relationship with respect to the clusters in the distribution that correspond to blinks and normal eye movements.

In an exemplary embodiment, the calibration process of generating the magnitude-change distribution and mapping ranges in the distribution to winks and blinks may be accomplished quickly. For example, the first time an HMD is worn by a new user, a calibration process may allow the HMD to adapt to the new user within thirty seconds, for example. Thus, the HMD may be able to quickly adapt to individual users and new situations, without explicit training by the user.

In another example implementation of method 300, an HMD may be configured to use k-means clustering with reference data and/or distribution generated based on detections from the eye or eyes of a user. The device may use k-means clustering to partition n observations into k clusters in which each observation belongs to the cluster with the nearest mean. The number of clusters k is an input parameter. For example, the HMD may use k-means clustering to determine 2 clusters from the continuously received sensor data. The HMD may be configured to map the clusters for the magnitude change ranges indicative of normal eye activity and blinks. Further, the HMD may be configured to find 3 clusters, with the additional cluster being indicative of the range of magnitude changes corresponding to winks. The HMD may further refine the clusters by repeating computations using the continuously received sensor data from the proximity sensors.

Similarly, the device may use an expectation-maximization algorithm to organize and compare the stored reference data with received sensor data. An expectation-maximization algorithm may be an iterative method for finding maximum likelihood or maximum a posteriori estimates of parameters within the stored reference data. A device may estimate the parameters of a statistical model, such as a histogram, to determine the Maximum Likelihood estimation. For example, the device may use the method of Maximum Likelihood estimation for the clusters within a distribution with unknown mean and variance to estimate values for the mean and variance when only knowing the height for the clusters. Using the mean and variance, the device may be configured to determine the types of eye motions that each cluster represents. Expectation-maximization may allow the clusters of the distribution to have different shapes overall allowing an increase in accuracy of determining differences in sensor data for eye motions. Combinations of the various algorithms may be used to configure the reference distribution to distinguish winks from other types of eye motions. Furthermore, an HMD may be configured to refine the cluster ranges through iteratively performing computations using the distribution information to improve the calibration of the HMD. Other examples may be used by the device as well.

D. Example Distributions

Figure 4:
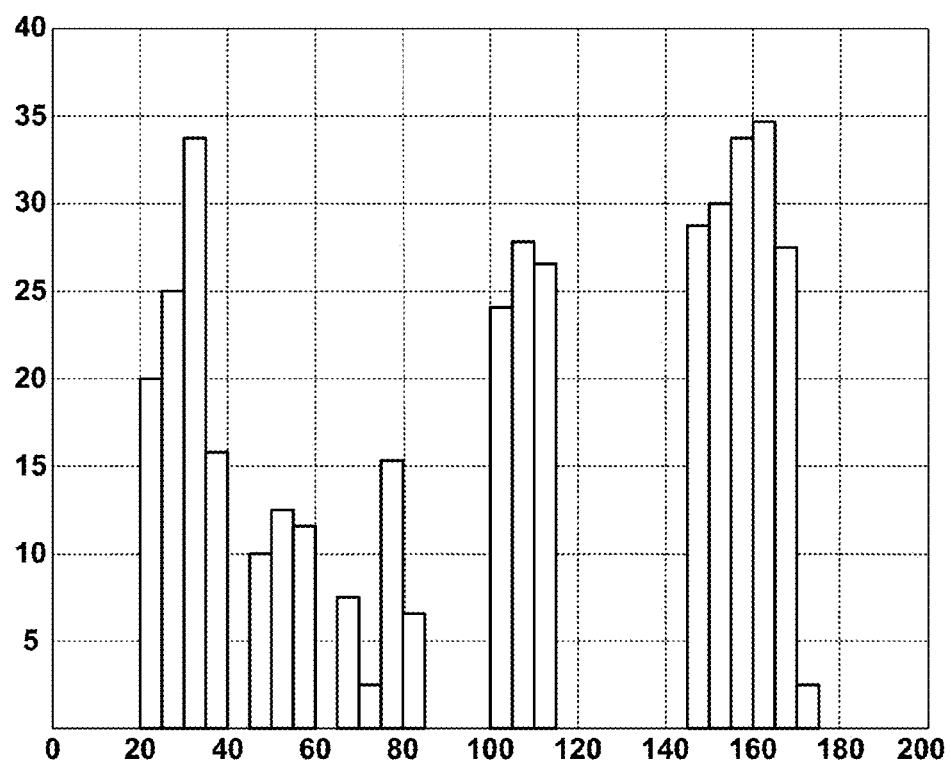
FIG. 4 illustrates an example of histogram that a computing system may use to distinguish winks from other eye gestures.

FIG. 4 shows an example distribution that a device, such as an HMD, may generate and use to distinguish winks from other eye gestures. In the example, the HMD developed the distribution in a bar graph format from continuously receiving sensor data from an eye or eyes of user in real-time. Additionally, the HMD may use the continuously received sensor data to generate other types of graphs, charts, or distributions as well. In some instances, the HMD may use more than one distribution to store and display information that may be used for calibrating the HMD. Thus, the example distribution shown in FIG. 4 serves merely as an example.

Within the example shown in FIG. 4, the distribution is in the form of a histogram, which may display the number of times each specific sensor data value was received by the HMD since the initial development of the histogram. As discussed above, the HMD may determine that different sensor data ranges may correspond to different types of eye motions. In some instances, the HMD may use specific information within the sensor data, such as changes in magnitudes, shapes, amplitudes, or other measurements. Moreover, the HMD may be configured to change the format of the stored information associated with the distribution, which may include switching the displayed parameters or the overall format of the distribution. The HMD may generate a distribution or may access the distribution from within memory. In some instances, the HMD may receive the distribution from another entity (e.g., a server).

The example distribution in FIG. 4 shows five clusters of bars extending upwards to various heights. Within the distribution, the placements of the bars on the horizontal axis (x-axis) represent different values of sensor data that the device that developed the distribution has received from the eye or eyes of a user. In some instances, the bars may represent the different values for changes in magnitudes of eye motions tracked by the device. Further, the heights of the bars represent the number of times the device has received that particular value of sensor data. For example, the higher a bar extends up, the higher number of times the device has detected and received sensor data corresponding to that specific value as specified on the horizontal axis. Thus, since a device is likely to detect normal eye activity and blinks on a regular basis, the distribution generated by the device may have bars at the ranges of sensor data for those types of eye motions extending higher than other types of eye motions that do not occur as often.

In the example distribution shown in FIG. 4, a device may identify the first cluster as corresponding to the range of sensor data (e.g., magnitude changes) that the device has determined is indicative of normal eye activity. Similarly, the device may determine that the second cluster may map the range that corresponds to sensor data as reference data indicative of blinks. A device may detect larger changes in magnitude in the sensor data received from blinks than the changes of magnitude detected from normal eye activity. Thus, the distribution may reflect this information by showing that the range for sensor data for blinks is higher than the range for normal eye activity. In some instances, the device may determine that the clusters may overlap due to similarities in the changes of magnitude detected from different types of eye motions. Similarly, the device may determine that some of the clusters may combine and may represent the same type of eye motion. For example, the device may determine that one cluster may represent the range for hard winks and another cluster may represent the range for soft winks.

Further, the sizes of each cluster within the distribution may vary depending on the degree of variation that the HMD may be configured to accept from the average of the cluster for the particular type of eye motion. An HMD may be configured to accept a broad array of sensor data that may be indicative of a blink since the HMD may detect a large number of involuntarily blinks during a given time interval. In contrast, an HMD may be calibrated to require more accurate sensor data for winks, for example, to prevent the HMD from executing false positives.

In addition, a device may make adjustments to a generated distribution, including starting a new distribution, shifting cluster ranges, adjusting the number of times a sensor data value has occurred, etc. For example, by making adjustments in the distribution, an HMD may further calibrate its system to account for changes in orientation, users, shading/lighting, environment or other factors that may impact the efficiency and accuracy of the HMD.

Figure 5A:
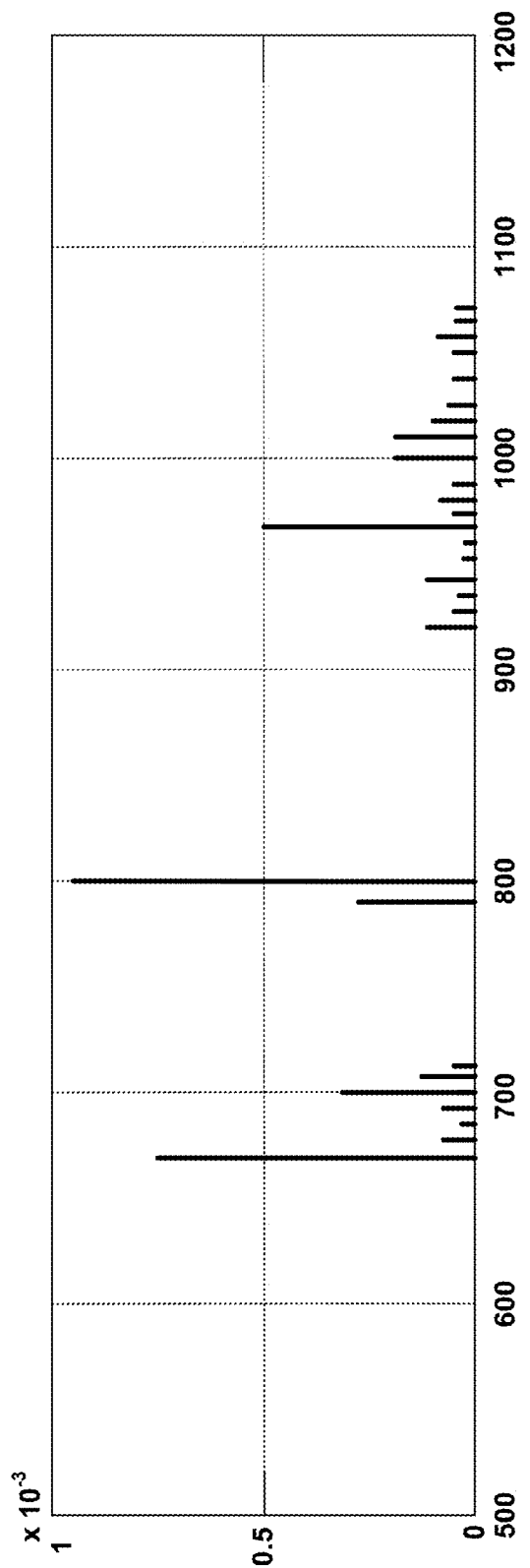
FIGS. 5A-5C illustrate additional examples of histograms that may be used by a computing system for distinguishing winks from other eye gestures.
Figure 5B:
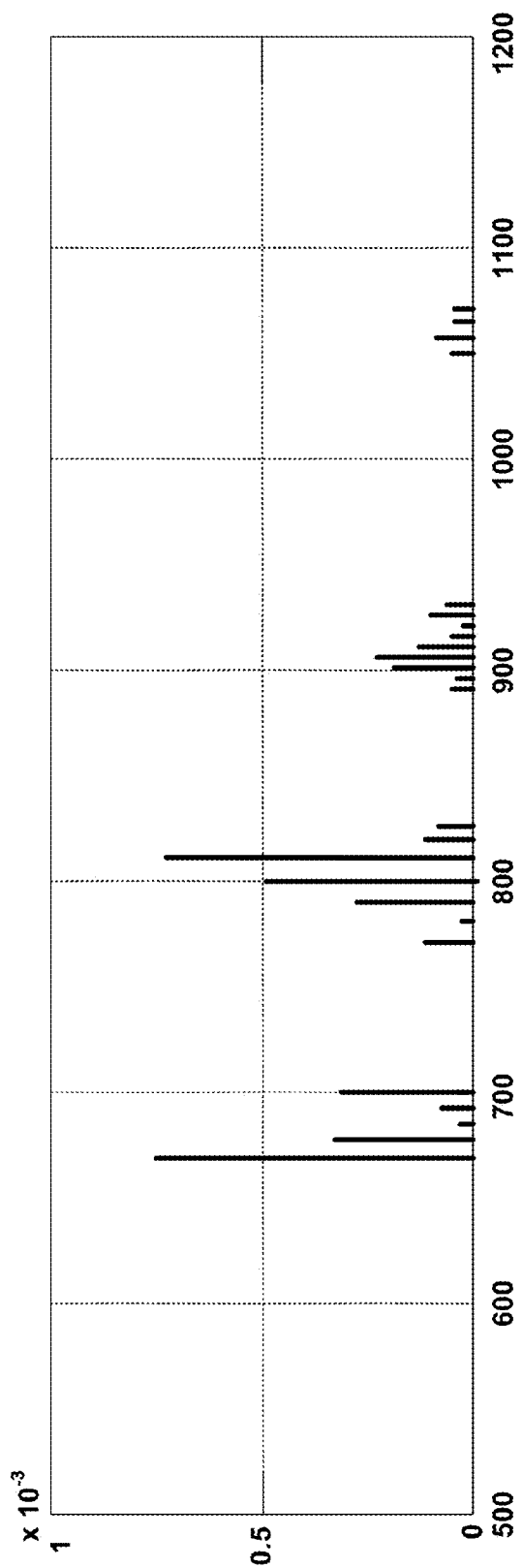
Figure 5C:
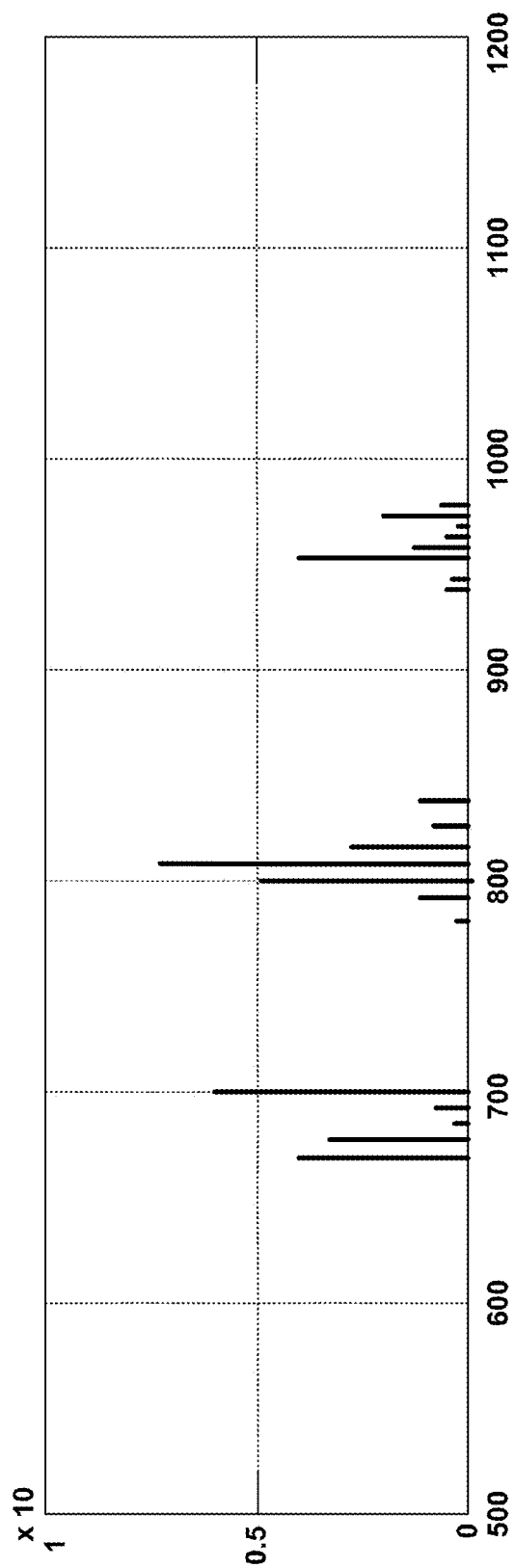

FIGS. 5A-5C illustrate various example distributions that a device may generate through receiving sensor data that corresponds to one or both eyes of a user. The different FIGS. 5A-5C may be associated with the same user-account, or may be unassociated distributions corresponding to different user-accounts. In the case that the different FIGS. 5A-5C are associated with the same user-account, the differences in the distributions may be the result of changes in orientation of the device capturing the sensor data, changes in user, differences in lighting or the environment, variances in the shading of the lenses associated with the device, or other causes, etc.

Similar to the example distribution shown in FIG. 4, one or more HMDs may have generated the distributions as shown in FIGS. 5A-5C, which are shown as two dimensional histograms, but may also include more/less dimensions in other examples. Further, an HMD may generate different types of probability distributions (e.g., Gaussian Models) to map reference data to reflect ranges of sensor data values (e.g., changes in detected magnitude) corresponding to different types of eye motions.

FIGS. 5A-5C show example distributions that display information corresponding to values in sensor data on the horizontal axis (x-axis). In some instances, the device may use a distribution that displays the changes of magnitude values from the detected eye motions on the horizontal axis. Further, the device may display the number of times each value of sensor data is detected by the device. The device may display the number of occurrences using the vertical axis (y-axis), similar to the example histogram shown in FIG. 4.

Through this layout, the device may develop a distribution that contains clusters, with each cluster showing the range of acceptable sensor data (or changes in magnitudes) for a particular type of eye motion. The ranges for each axis may vary in other examples, which an HMD may also be able to adjust the ranges of acceptable sensor data for eye types. The HMD may extend ranges that are mapped to corresponding types of eye motions. Additionally, the various clusters may be repositioned along the horizontal axis due to different variations caused by varying orientation of the HMD relative to the wearer, differences in the range of shade of the lenses, or different wearers providing commands to the HMD. The device may be configured to analyze the clusters and map the clusters as representative of sensor data values indicative of certain types of eye motions. In some examples, the device may be preconfigured to search for at least two initial clusters, one representative of a sensor data range corresponding to normal activity and another cluster representative of a sensor data range corresponding to blinks. Using the two initial clusters, the device may determine that any sensor data received that extends outside the clusters may qualify as indicative of a wink depending if the received sensor data's value surpasses a threshold difference that the device is programmed to require. By requiring a threshold qualification, the device may avoid mistakenly labeling sensor data values that may be indicative of normal eye activity, blinks, or noise, as a wink, since the device is programmed to accurately examine the differences in sensor data values.

FIG. 5A shows a distribution developed by an HMD that includes three main clusters. The distribution displays a first cluster at approximately 700 units on the horizontal axis, which may represent sensor data having values around 700 units or changes in magnitude values at approximately 700 units, for example. The second cluster exists at roughly 800 units on the horizontal axis and the third cluster is a wider range cluster that exists at roughly 1000 units on the horizontal axis. It should be understood that the units may be any unit of measurement that may help a device determine differences between eye motions and may be based off the parameters of the detected eye motions.

In the example distribution of FIG. 5A, the cluster at approximately 800 units on the horizontal axis may represent reference signals indicative of blinks. A device may determine that the cluster at approximately 800 units on the horizontal axis is indicative of blinks by recognizing that a cluster of lower units is located at roughly 700 units on the horizontal axis. The device may also use the high occurrence level of sensor data values within the cluster's range has been detected to determine that a device may likely have detected a large number of involuntary blinks. Thus, a device may look at the position of a cluster relative to other clusters, the values of sensor data along the horizontal axis as well as the frequency of occurrences within the ranges as shown by the height of the clusters to determine which type of eye motion the cluster may represent.

Further, the different clusters that extend across ranges of sensor values not around the 800 units sensor value may indicate winks or other eye gestures since the sensor values are not around the highly occurring blinks detected. A computing device may be configured with rough estimations of roughly the normal values of ranges certain types of eye motions usually have.

Additionally, the clusters outside the main cluster at 800 units may be indicative of other types of eye motions. For example, the cluster at approximately 800 units on the horizontal axis may correspond to blinks and the cluster(s) extending above the cluster corresponding to blinks may be indicative of winks.

FIG. 5B shows another example distribution that may be a variation of the distributions shown in FIG. 5A and FIG. 5C or may be unassociated with the distribution in FIG. 5A. FIG. 5B may be the same distribution of FIG. 5A, but reflecting possible adjustments the HMD may have made to the distribution in response to detecting different eye gestures in order to update and calibrate the eye recognition system. The overall adjustment reflected within the distribution may have resulted from a change in the orientation of the HMD with the wearer, a variance in the shade of lenses of the HMD, or a different user using the HMD, for example. For example, a different wearer would likely have blinks and winks that occur at different sensor data values from the original wearer of the HMD. An HMD may constantly update the distribution in real-time to allow the HMD to keep the eye recognition system working properly and efficiently.

Similarly, FIG. 5C shows an additional example distribution. The example distribution is in the form of a histogram and includes three large clusters, but may contain more or less in other examples. The computing system may recognize each cluster as representative of different types of eye gesture. In some examples, the computing system may determine that multiple clusters represent the same eye gesture that occur at different ranges of sensor data values (e.g., a hard wink and a soft wink). In other examples, the computing system may cause the histogram to include additional or fewer clusters and the changes made be made in real-time.

Furthermore, similar to the other histograms shown in FIGS. 5A-5B, the computing system may determine that any sensor data within the values of the cluster positioned roughly at sensor data 800 units may represent blinks. The computing system may also determine that the cluster below 800 represents the normal activity and the cluster extending beyond a threshold distance above the first two clusters may represent the range of sensor data values indicative of winks. However, the cluster with high frequency of occurrences around sensor value 800 units may also indicate a wink expression in some examples. The histogram shown in FIG. 5C may be separate from the other histograms or may be associated with the other histograms and/or probability distributions in some manner. The changes in the histograms shown in the FIGS. 5A-5C may represent that possible adjustments that the HMD may be making to calibrate the eye recognition system.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium. In addition, circuitry may be provided that is wired to perform logical functions in any processes or methods described herein.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and examples have been disclosed herein, other aspects and examples will be apparent to those skilled in the art. The various aspects and examples disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:

1. A computer-implemented method comprising:
    receiving, from one or more proximity sensors of a head mountable device (HMD), sensor data corresponding to at least one eye;
    determining a distribution of magnitude changes in the sensor data over a predetermined interval of time;
    identifying, within the distribution, a first magnitude-change cluster and a second magnitude-change cluster, wherein the first magnitude-change cluster and the second magnitude-change cluster correspond to a first range and a second range of magnitude changes, respectively;
    generating reference data that maps the second magnitude-change cluster to intentional blinks and the first magnitude-change cluster to normal eye movement based on the relationship between the first magnitude-change cluster and the second magnitude-change cluster;
    comparing subsequent sensor data to the reference data to detect a blink; and in response to detecting a blink, performing one or more of the following: (i) capturing an image with a camera of the HMD, (ii) performing an update of a system of the HMD, and (iii) performing an operation regarding an interface of the HMD.

2. The method of claim 1, further comprising:
    in response to detecting a blink, causing a computing device to initiate a process that corresponds to the blink.

3. The method of claim 1, further comprising:
based on the distribution, determining a threshold magnitude change that is greater than the first range and the second range of magnitude changes; and
generating reference data that maps magnitude changes that are greater than the threshold magnitude change to winks.

4. The method of claim 1, further comprising:
based on the distribution, determining a third magnitude-change cluster having a third range of magnitude changes, wherein the third range is greater than the first range and the second range of magnitude changes; and
generating reference data that maps the third magnitude-change cluster to winks.

5. The method of claim 1, further comprising:
mapping the first magnitude-change cluster to normal eye movement based on the relationship between the first magnitude-change cluster and the second magnitude-change cluster.

6. The method of claim 1, further comprising:
determining a match between the reference data with a particular user-account; and
loading wink threshold data for the user.

7. The method of claim 1, wherein the sensor data is generated by proximity sensors.

8. The method of claim 1, wherein the method is performed in response to detecting a calibration event.

9. The method of claim 8, wherein the calibration event comprises detecting that the device has changed in orientation relative to the user.

10. The method of claim 8, wherein the calibration event comprises determining a change in lighting.

11. A system comprising:
a computing system associated with a head mountable device (HMD) configured to receive sensor data corresponding to an eye;
a computer-readable medium; and
program instructions stored on the computer-readable medium and executable by at least one processor to perform functions comprising:
receiving, from one or more proximity sensors, sensor data corresponding to at least one eye;
determining a distribution of magnitude changes in the sensor data over a predetermined interval of time;
identifying, within the distribution, a first magnitude-change cluster and a second magnitude-change cluster, wherein the first magnitude-change cluster and the second magnitude-change cluster correspond to a first range and a second range of magnitude changes, respectively; and
generating reference data that maps the second magnitude-change cluster to intentional blinks and the first magnitude-change cluster to normal eye movement based on the relationship between the first magnitude-change cluster and the second magnitude-change cluster.

12. The system of claim 11, wherein the functions further comprise:
comparing subsequent sensor data to the reference data to detect a blink; and
in response to detecting a blink, causing a computing device to initiate a process that corresponds to the blink.

13. The system of claim 11, wherein the functions further comprise:
based on the distribution, determining a threshold magnitude change that is greater than the first range and the second range of magnitude changes; and
generating reference data that maps magnitude changes that are greater than the threshold magnitude change to winks.

14. The system of claim 11, wherein the functions further comprise:
based on the distribution, determining a third magnitude-change cluster having a third range of magnitude changes, wherein the third range is greater than the first range and the second range of magnitude changes; and
generating reference data that maps the third magnitude-change cluster to winks.

15. The system of claim 11, wherein the sensor data includes information associated with a magnitude related to the eye.

16. The system of claim 11, wherein the functions further comprise:
associating the reference data with a particular user-account.

17. A non-transitory computer readable medium having stored therein instructions executable by a computing device associated with a head mountable device (HMD) to cause the computing device to perform functions, the functions comprising:
receiving, from one or more proximity sensors, sensor data corresponding to at least one eye;
determining a distribution of magnitude changes in the sensor data over a predetermined interval of time;
identifying, within the distribution, a first magnitude-change cluster and a second magnitude-change cluster, wherein the first magnitude-change cluster and the second magnitude-change cluster correspond to a first range and a second range of magnitude changes, respectively; and
generating reference data that maps the second magnitude-change cluster to intentional blinks and the first magnitude-change cluster to normal eye movement based on the relationship between the first magnitude-change cluster and the second magnitude-change cluster.

18. The non-transitory computer readable medium of claim 17, wherein the functions further comprises:
comparing subsequent sensor data to the reference data to detect a blink; and
in response to detecting a blink, causing a computing device to initiate a process that corresponds to the blink.

19. The non-transitory computer readable medium of claim 17, wherein the functions further comprise:
based on the distribution, determining a threshold magnitude change that is greater than the first range and the second range of magnitude changes; and
generating reference data that maps magnitude changes that are greater than the threshold magnitude change to winks.

20. The non-transitory computer readable medium of claim 17, wherein the functions further comprise:
based on the distribution, determining a third magnitude-change cluster having a third range of magnitude changes, wherein the third range is greater than the first range and the second range of magnitude changes; and
generating reference data that maps the third magnitude-change cluster to winks.

* * * * *